(12) United States Patent
Kocev et al.

(10) Patent No.: US 11,023,241 B2
(45) Date of Patent: Jun. 1, 2021

(54) SYSTEMS AND METHODS FOR SELECTIVELY BYPASSING ADDRESS-GENERATION HARDWARE IN PROCESSOR INSTRUCTION PIPELINES

(71) Applicant: Advanced Micro Devices, Inc., Santa Clara, CA (US)

(72) Inventors: Andrej Kocev, Boston, MA (US); Jay Fleischman, Fort Collins, CO (US); Kai Troester, Boston, MA (US); Johnny C. Chu, Boston, MA (US); Tim J. Wilkens, Austin, TX (US); Neil Marketkar, Somerville, MA (US); Michael W. Long, Boston, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 114 days.

(21) Appl. No.: 16/106,515

(22) Filed: Aug. 21, 2018

(65) Prior Publication Data
US 2020/0065108 A1 Feb. 27, 2020

(51) Int. Cl.
*G06F 9/38* (2018.01)
*G06F 9/30* (2018.01)

(52) U.S. Cl.
CPC ........ *G06F 9/3826* (2013.01); *G06F 9/30134* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,694,424 B1 * | 2/2004 | Keller | G06F 9/3834 712/216 |
| 6,721,908 B1 | 4/2004 | Kim et al. | |
| 10,459,725 B2 * | 10/2019 | Modi | G06F 9/3824 |
| 2002/0087841 A1 * | 7/2002 | Faraboschi | G06F 9/30043 712/225 |
| 2009/0204785 A1 * | 8/2009 | Yates, Jr. | G06F 9/30174 711/205 |
| 2009/0204796 A1 * | 8/2009 | Mullen | G06F 9/3826 712/227 |

(Continued)

FOREIGN PATENT DOCUMENTS

EP 2778941 A1 9/2014

OTHER PUBLICATIONS

Korean Intellectual Property Office; International Search report and Written Opinion; International Application No. PCT/US2019/047217; dated Dec. 6, 2019.

*Primary Examiner* — Michael Sun
(74) *Attorney, Agent, or Firm* — Faegre Drinker Biddle & Reath LLP (57) ABSTRACT

Systems and methods selectively bypass address-generation hardware in processor instruction pipelines. In an embodiment, a processor includes an address-generation stage and an address-generation-bypass-determination unit (ABDU). The ABDU receives a load/store instruction. If an effective address for the load/store instruction is not known at the ABDU, the ABDU routes the load/store instruction via the address-generation stage of the processor. If, however, the effective address of the load/store instruction is known at the ABDU, the ABDU routes the load/store instruction to bypass the address-generation stage of the processor.

25 Claims, 10 Drawing Sheets

(56) References Cited

U.S. PATENT DOCUMENTS

2009/0240919 A1\* 9/2009 Alexander .......... G06F 9/30043
712/214
2011/0302344 A1 12/2011 Bell et al.
2017/0206086 A1\* 7/2017 Modi .................... G06F 9/3836

\* cited by examiner

SYSTEMS AND METHODS FOR SELECTIVELY BYPASSING ADDRESS-GENERATION HARDWARE IN PROCESSOR INSTRUCTION PIPELINES

BACKGROUND OF THE DISCLOSURE

In current processor implementations, instructions are executed by an instruction pipeline, which is a set of functional units (i.e., digital logic circuits) that includes a branch-prediction unit and a fetch unit that are collectively referred to as the front end of the pipeline, a decode unit that includes a dispatch stage, an execute/scheduler unit (EXSC), and a load/store unit that interfaces with a level-1 (L1) data cache that in turn interfaces with a level-2 (L2) data cache. The instruction pipeline handles multiple types of instructions including load/store instructions, each of which is either a load instruction for retrieving data from a memory address or a store instruction for writing data to a memory address. The memory address that a load/store instruction loads from or stores to is known as the effective address for the load/store instruction, and is specified in the load/store instruction using an addressing mode.

The EXSC includes a digital-logic circuit known as an address-generation (AGEN) stage (a.k.a. AGEN hardware, an AGEN unit (AGU), an address computation unit (ACU), and/or the like), which computes the effective address for every load/store instruction that is handled by the instruction pipeline. Each AGEN computation incurs costs in terms of at least time and power. Each load/store instruction then proceeds from the EXSC to the load/store unit, which executes the load/store instruction using the effective address computed by the AGEN stage. By computing an effective address at the AGEN stage for every load/store instruction, current processors waste both time and power computing effective addresses for load/store instructions for which all of the inputs for computing the effective address are known at a point that precedes the AGEN stage in the instruction pipeline.

SUMMARY OF THE DISCLOSURE

Disclosed herein are systems and methods for selectively bypassing AGEN hardware in processor instruction pipelines. Among other advantages, a processor does not waste time and power using its AGEN stage to compute an effective address for every load/store instruction in a given set of instructions (i.e., in a given instance of executable code, such as a program, an application, an applet, or the like), but rather does so only for an identified subset of those load/store instructions. Among other technical benefits, processing time and power consumption are both reduced.

In some embodiments, the present systems and methods identify instances in which, at a point that precedes the AGEN stage in the instruction pipeline, all of the inputs for the AGEN computation for respective load/store instructions are known. In such instances, the load/store instruction is routed to bypass the AGEN stage and not incur an AGEN computation, while load/store instructions for which at least one AGEN-computation input is not known at that point in the instruction pipeline are routed via the AGEN stage, such that the AGEN stage still performs the AGEN computation for those load/store instructions.

The term "AGEN-computation input" as used herein refers to an input that the AGEN stage would use to calculate an effective address for a given load/store instruction if that load/store instruction were actually routed via the AGEN stage, which according to the present systems and methods, not all load/store instructions are. In some instances, an AGEN-computation input is known at the pre-AGEN-stage point in the pipeline because that input is a constant value that by definition is not subject to change. Two examples of this type of load/store instruction are (i) program-counter- (PC)-relative (a.k.a. instruction-pointer-(IP)-relative) load/ store instructions and (ii) displacement-only (a.k.a. immediate-displacement) load/store instructions.

In other instances, a given AGEN-computation input is known at the pre-AGEN-stage point in the instruction pipeline because that input has a known value (stored in, e.g., a register) that could change (due, e.g., to execution of one or more other instructions). One example of this second type of load/store instruction is a stack-pointer-(SP)-relative load/ store instruction. With respect to this second type of load/ store instruction, the present systems and methods monitor such dependencies and only allow these load/store instructions to fully bypass the AGEN stage when no events (such as the relevant register being overwritten by a subsequent instruction) occur that invalidate reliance on such dependencies. When such events do occur, embodiments of the present systems and methods "back out" of having those load/store instructions bypass the AGEN stage and instead route them via the AGEN stage. This incurs costs in terms of time and power, but is done in order to achieve accurate execution.

In an embodiment, with respect to the load/store instructions that are routed to bypass the AGEN stage, the processor performs an add operation of the load/store instruction's AGEN-computation inputs (i.e., the effective-address-relevant operands of that load/store instruction)—performed at, e.g., the load/store unit—to determine the effective addresses for those load/store instructions. This still incurs costs in terms of time and power, though these costs are less than what would be incurred by those same load/store instructions being processed by the AGEN stage. In some embodiments, preparation for that add operation is made at the pre-AGEN-stage point in the instruction pipeline by converting one or more register references (e.g., a reference to an SP register (rSP)) into the integer value that is currently stored in the referenced register, preventing the later stage (e.g., the load/store unit) that performs the add operation from having to access that register to retrieve that same value.

The present systems and methods address a number of technical problems with prior processor implementations, including the technical problem that prior implementations route every load/store instruction via their respective AGEN stage for computation of an effective address. This wastes both time and power. The present systems and methods represent a technical solution to this problem by determining in digital logic at a processor-pipeline stage that precedes the AGEN stage whether an effective address is already known for each load/store instruction. If not, the load/store instruction is routed via the AGEN stage. If so, the load/store instruction is routed to bypass the AGEN stage.

One embodiment takes the form of a method that is carried out by one or more processors. The method includes receiving a load/store instruction into an AGEN-bypass-determination unit (ABDU) of a processor. If an effective address for the load/store instruction is not known at the ABDU, the load/store instruction is routed via the AGEN stage of the processor. If, however, the effective address for the load/store instruction is known at the ABDU, the load/ store instruction is routed to bypass the AGEN stage. Another embodiment takes the form of an integrated circuit having thereon instructions that when executed cause the integrated circuit or a system in which the integrated circuit is embedded or otherwise installed or with which the integrated circuit is communicatively connected to carry out the method. Another embodiment takes the form of a system having a processor and non-transitory data storage containing instructions that when executed by the processor cause the system to carry out the method.

Another embodiment takes the form of a processor that includes an AGEN stage and an ABDU. The ABDU receives a load/store instruction. If an effective address for the load/store instruction is not known at the ABDU, the load/store instruction is routed via the AGEN stage. If, however, the effective address for the load/store instruction is known at the ABDU, the load/store instruction is routed to bypass the AGEN stage.

Another embodiment takes the form of a non-transitory computer-readable medium containing instructions executable by an integrated-circuit-manufacturing system to fabricate a processor having at least the elements listed in the preceding paragraph. In at least one such embodiment, the instructions include a register-transfer-level (RTL) representation of the processor. In at least one other such embodiment, the instructions include high-level design language (HDL) instructions representative of the processor.

In an embodiment, the effective address for the load/store instruction is known at the ABDU when the load/store instruction is a PC-relative load/store instruction and/or a displacement-only load/store instruction. In other examples, the effective address for the load/store instruction is known at the ABDU when (i) the load/store instruction is an SP-relative load/store instruction and (ii) the ABDU has a current value of an rSP.

In an embodiment, the AGEN stage computes the effective address for the load/store instruction using a plurality of effective-address inputs for the load/store instruction. The effective address for the load/store instruction is not known at the ABDU includes when at least one of the effective-address inputs for the load/store instruction is not known at the ABDU. The effective address for the load/store instruction is known at the ABDU when each of the effective-address inputs for the load/store instruction is known at the ABDU.

In an embodiment, the processor includes a load/store unit, a first circuit path that communicatively couples the ABDU and the load/store unit and that includes the AGEN stage, and a second circuit path that communicatively couples the ABDU and the load/store unit and that bypasses the AGEN stage. Routing the load/store instruction via the AGEN stage includes routing the load/store instruction via the first circuit path. Routing the load/store instruction to bypass the AGEN stage includes routing the load/store instruction via the second circuit path. In another embodiment, routing the load/store instruction via the second circuit path includes asserting a bypass-eligible flag that corresponds with the load/store instruction. The load/store unit processes load/store instructions for which the corresponding bypass-eligible flag is asserted and discards load/store instructions for which the corresponding bypass-eligible flag is cleared.

In an embodiment, the method is carried out by the processor with respect to a first integer number of load/store instructions per clock cycle. The method further includes asserting a corresponding bypass-eligible flag for each load/store instruction that is routed via the second circuit path. The load/store unit processes load/store instructions for which the corresponding bypass-eligible flag is asserted and discards load/store instructions for which the corresponding bypass-eligible flag is cleared. One such embodiment includes asserting a corresponding bypass-eligible flag for at most a second integer number of load/store instructions per clock cycle, where the second integer number is less than the first integer number. In one such embodiment, the load/store unit has exactly the second integer number of load/store pipelines.

In an embodiment, the load/store unit computes effective addresses for load/store instructions received by the load/store unit via the second circuit path. In an embodiment, the load/store instruction includes a reference to a register, and the method includes replacing the reference in the load/store instruction with a value currently stored in the register.

Further variations and permutations of the above-listed examples of embodiments are described herein. Moreover, it is expressly noted that such variations and permutations that are described herein can be implemented with respect to any embodiments, including with respect to any method embodiments, with respect to any system embodiments, and with respect to any integrated-circuit-fabrication-instruction computer-readable-medium embodiments, independent of the type of embodiment in connection with which such variations and permutations are primarily described herein. Furthermore, this flexibility and cross-applicability of embodiments is present in spite of the use of any slightly different language (e.g., process, method, steps, functions, set of functions, and the like) to describe and/or characterize such embodiments.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION OF THE DRAWINGS

For the purposes of promoting an understanding of the principles of the present disclosure, reference is made to the embodiments illustrated in the drawings, which are described below. The embodiments disclosed herein are not intended to be exhaustive or to limit the present disclosure to the precise form disclosed in the following detailed description. Rather, the embodiments are chosen and described so that others skilled in the art may utilize their teachings. Therefore, no limitation of the scope of the present disclosure is thereby intended.

In some instances throughout this disclosure and in the claims, numeric modifiers such as first, second, third, and fourth are used in reference to various components, data such as various identifiers, and/or other elements. Such use is not intended to denote or dictate a specific or required order of the elements. Rather, this numeric terminology is used to assist the reader in identifying the element that is being referenced and in distinguishing that element from other elements, and should not be narrowly interpreted as insisting upon any particular order.

Figure 1:
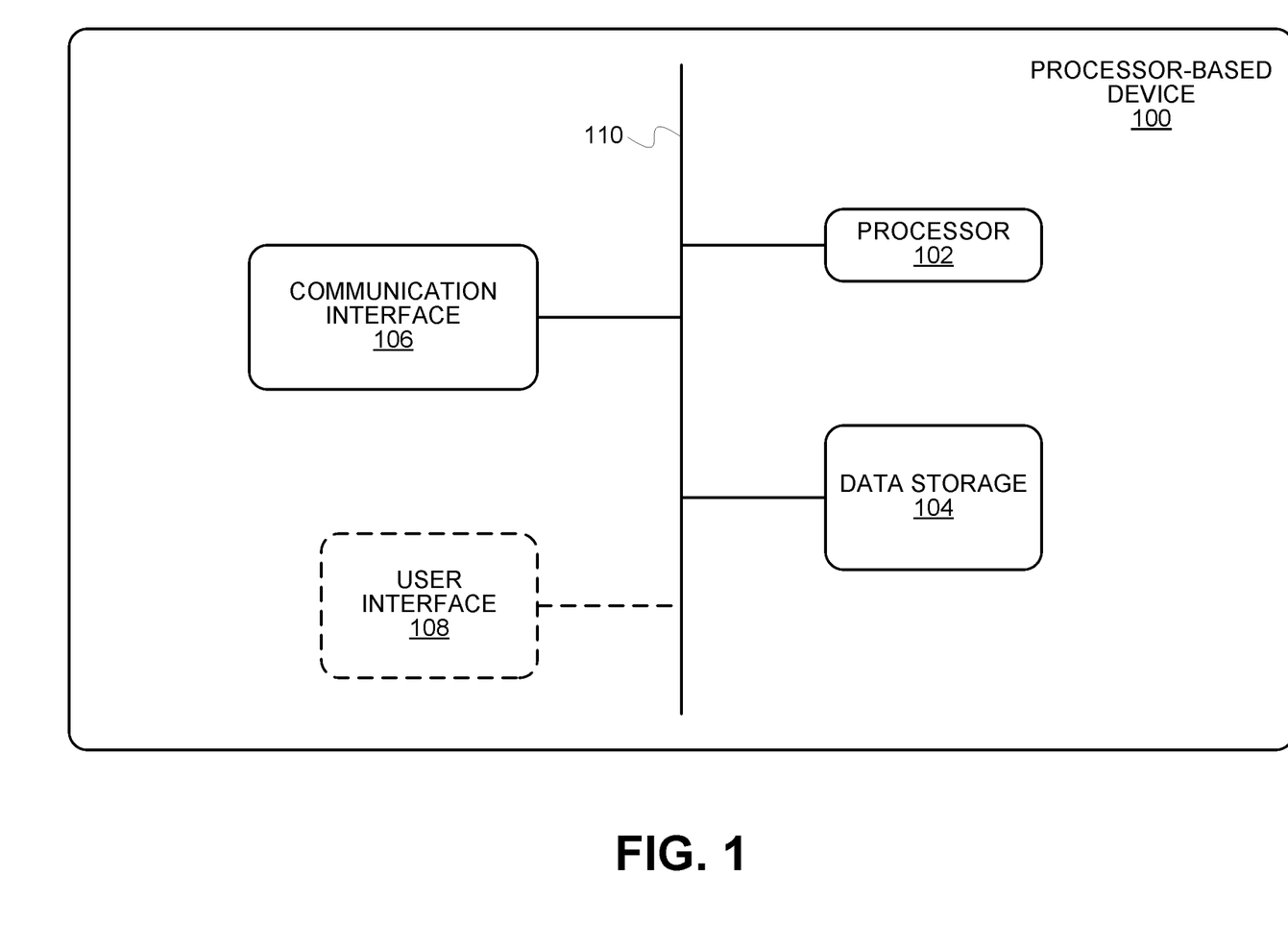
FIG. 1 is a simplified diagram of an example processor-based device that includes an example processor, in accordance with an embodiment.

FIG. 1 depicts an example of a processor-based device 100 that includes a processor 102, a data storage 104, a communication interface 106, and an optional user interface 108, all of which are communicatively interconnected via a bus structure 110. The processor-based device 100 could include different components, as the depiction in FIG. 1 is by way of example. As examples, the processor-based device 100 could be a computer, a personal computer, a desktop computer, a workstation, a laptop computer, a tablet, a cellular phone, a smartphone, a wearable, a personal digital assistant (PDA), a set-top box, a gaming console, a gaming controller, a server, a printer, or any other processor-based device.

The processor 102 could be a microprocessor, a central processing unit (CPU), a graphics processing unit (GPU), one or more processor cores or any other type of processor that implements an instruction pipeline and is equipped and configured to embody and/or carry out one or more embodiments of the present systems and methods. The data storage 104 could be any type of non-transitory data storage such as a random-access memory (RAM), a read-only memory (ROM), an erasable programmable ROM (EPROM), an electrically erasable programmable ROM (EEPROM), flash memory, magnetic disk, optical disk, and/or the like.

In an embodiment, the communication interface 106 includes a wired-communication interface for communicating with one or more other processor-based devices and/or other communication entities according to a wired-communication protocol such as Ethernet. In an embodiment, instead of or in addition to the wired-communication interface, the communication interface 106 includes a wireless-communication interface that includes the corresponding hardware, firmware, and the like for communicating wirelessly with one or more devices and/or other entities using one or more wireless-communication protocols such as Wi-Fi, Bluetooth, LTE, WiMAX, CDMA, and/or the like.

The user interface 108 is not present in all instances of the processor-based device 100. For example, in instances in which the processor-based device 100 is a network server, it could be the case that a user interface is not present. In instances in which the user interface 108 is present, it includes one or more input devices and/or one or more output devices. The one or more input devices could include a touchscreen, a keyboard, a mouse, a microphone, and/or the like, while the one or more output devices could include a display (e.g., a touchscreen), one or more speakers, one or more indicator light emitting diodes (LEDs), and/or the like.

Figure 2:
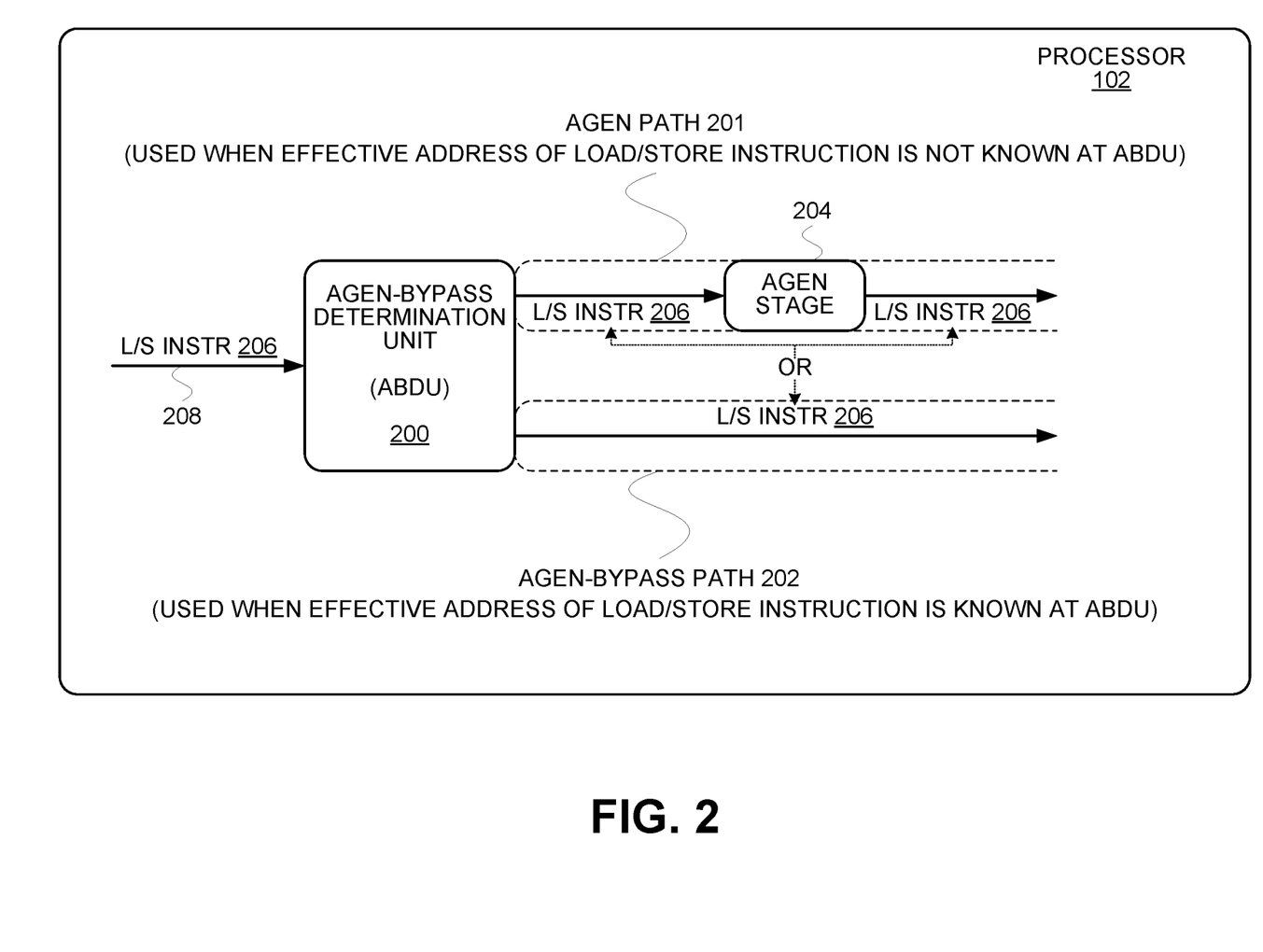
FIG. 2 is a partial view of a first example instruction pipeline of the processor of FIG. 1, in accordance with an embodiment.

FIG. 2 is a partial view of an example of an instruction pipeline of the processor 102, depicting the processor 102 as including an ABDU 200 and an AGEN stage 204. In some embodiments, the ABDU 200 is implemented as a deterministic digital-logic circuit, though an implementation of the ABDU 200 as one or a combination of multiple state machines is used in other embodiments. In an embodiment, the AGEN stage 204 is implemented as a deterministic digital-logic circuit, and as is known in the art, could include one or more arithmetic logic units (ALUs), one or more of its own registers, and/or the like, and computes effective addresses using one or more types of arithmetic such as linear arithmetic, modulo arithmetic, and/or the like.

As depicted in FIG. 2, the ABDU 200 receives a load/store instruction 206 via a communication path 208, and routes the load/store instruction 206 via either a first circuit path referred to herein as the AGEN path 201 or a second circuit path referred to herein as the AGEN-bypass path 202. Both the AGEN path 201 and the AGEN-bypass path 202 are circuit paths that include hardware such as wires, contacts, pins, circuit elements such as flip-flops, and/or other hardware for communicating electrical signals.

The AGEN path 201 includes the AGEN stage 204. The AGEN-bypass path 202 does not include the AGEN stage 204. The ABDU 200 routes the load/store instruction 206 via the AGEN path 201 when the effective address of the load/store instruction 206 is not known at the ABDU 200, and instead routes the load/store instruction 206 via the AGEN-bypass path 202 when the effective address of the load/store instruction 206 is known at the ABDU 200. In an embodiment, the effective address of the load/store instruction 206 is not known at the ABDU 200 when at least one of the inputs for computing that effective address is not known at the ABDU 200, whereas the effective address of the load/store instruction 206 is known at the ABDU 200 when each of the inputs for computing that effective address is known at the ABDU 200. The ABDU 200 need not actually calculate the effective address of the load/store instruction 206.

Figure 3:
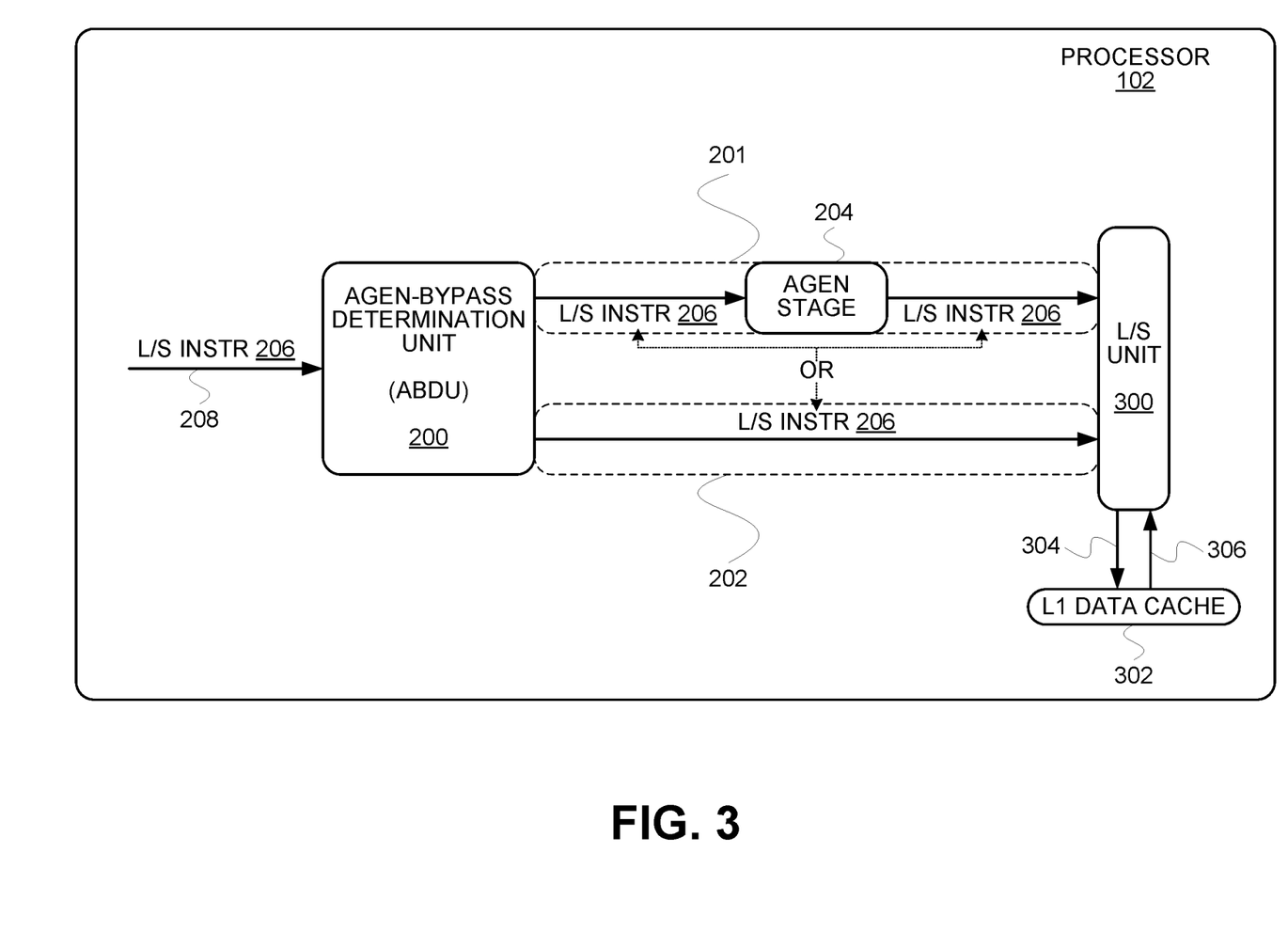
FIG. 3 is a partial view of a second example instruction pipeline of the processor of FIG. 1, in accordance with an embodiment.

FIG. 3 depicts another example of the instruction pipeline of the processor 102 as further including a load/store unit 300 and an L1 data cache 302. The AGEN path 201 and the AGEN-bypass path 202 both extend between the ABDU 200 and the load/store unit 300, which receives load/store instructions via the AGEN path 201 and the AGEN-bypass path 202, and processes those load/store instructions to the L1 data cache 302 via data paths 304 and 306. The L1 data cache 302 interfaces with an L2 data cache (not depicted). In an embodiment, when processing a load/store instruction received via the AGEN-bypass path 202, the load/store unit 300 determines an effective address for the load/store instruction by performing an add operation on two or more operands of the load/store instruction.

Figure 4:
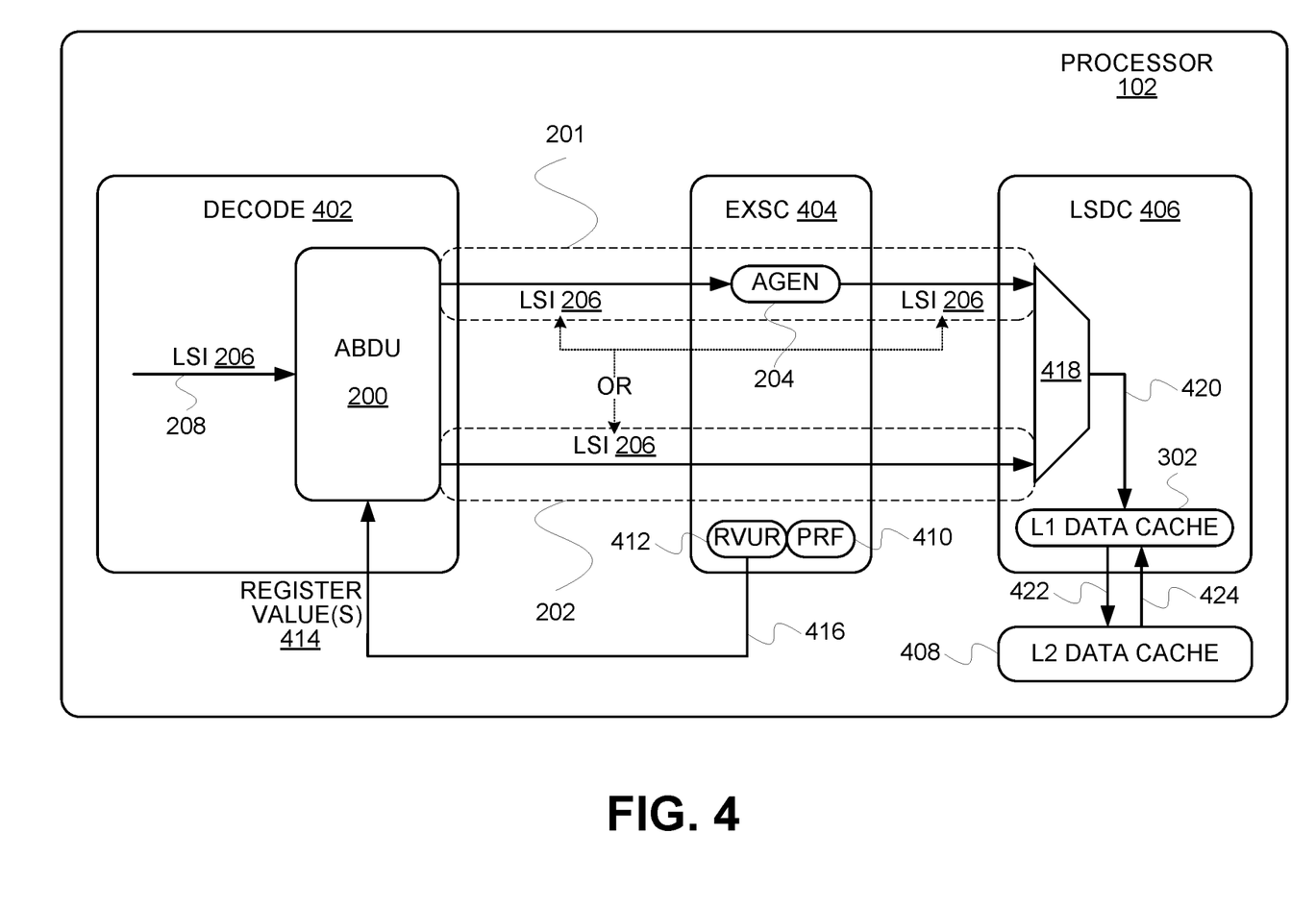
FIG. 4 is a partial view of a third example instruction pipeline of the processor of FIG. 1, in accordance with an embodiment.

FIG. 4 depicts an embodiment in which the instruction pipeline of the processor 102 includes a decode unit 402 within which the ABDU 200 resides, an EXSC 404 within which the AGEN stage 204 resides, and a load/store-and-data-cache unit (LSDC) 406 that carries out substantially the functionality of the load/store unit 300 of FIG. 3, though with the L1 data cache 302 being an incorporated element.

The EXSC 404 includes a physical register file (PRF) 410 and a digital-logic device referred to herein as a register-value-upstream relay (RVUR) 412, which communicates one or more register values 414—that the RVUR 412 reads from the PRF 410—via a data link 416 to the ABDU 200. The LSDC 406 includes a selector circuit 418 that interfaces with the AGEN path 201, the AGEN-bypass path 202, and the L1 data cache 302.

Figure 5:
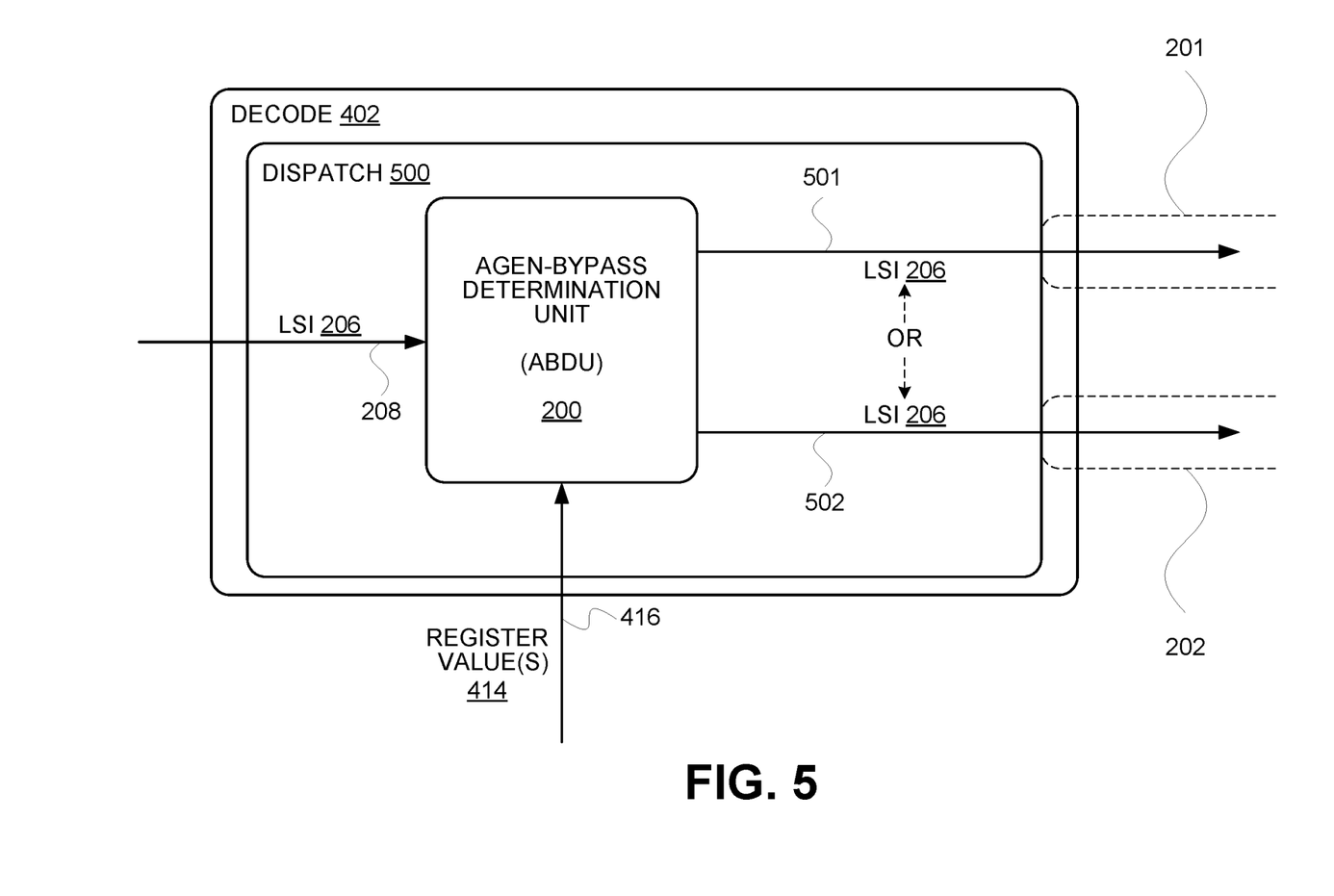
FIG. 5 is a partial view of a fourth example instruction pipeline of the processor of FIG. 1 in which an example AGEN-bypass-determination unit (ABDU) resides in a dispatch stage of a decode unit of the fourth example instruction pipeline, in accordance with an embodiment.

FIG. 5 depicts an embodiment in which a dispatch stage 500 resides within the decode unit 402 and includes the ABDU 200. Data links 501 and 502 form initial portions of the AGEN path 201 and the AGEN-bypass path 202, respectively.

Figure 6:
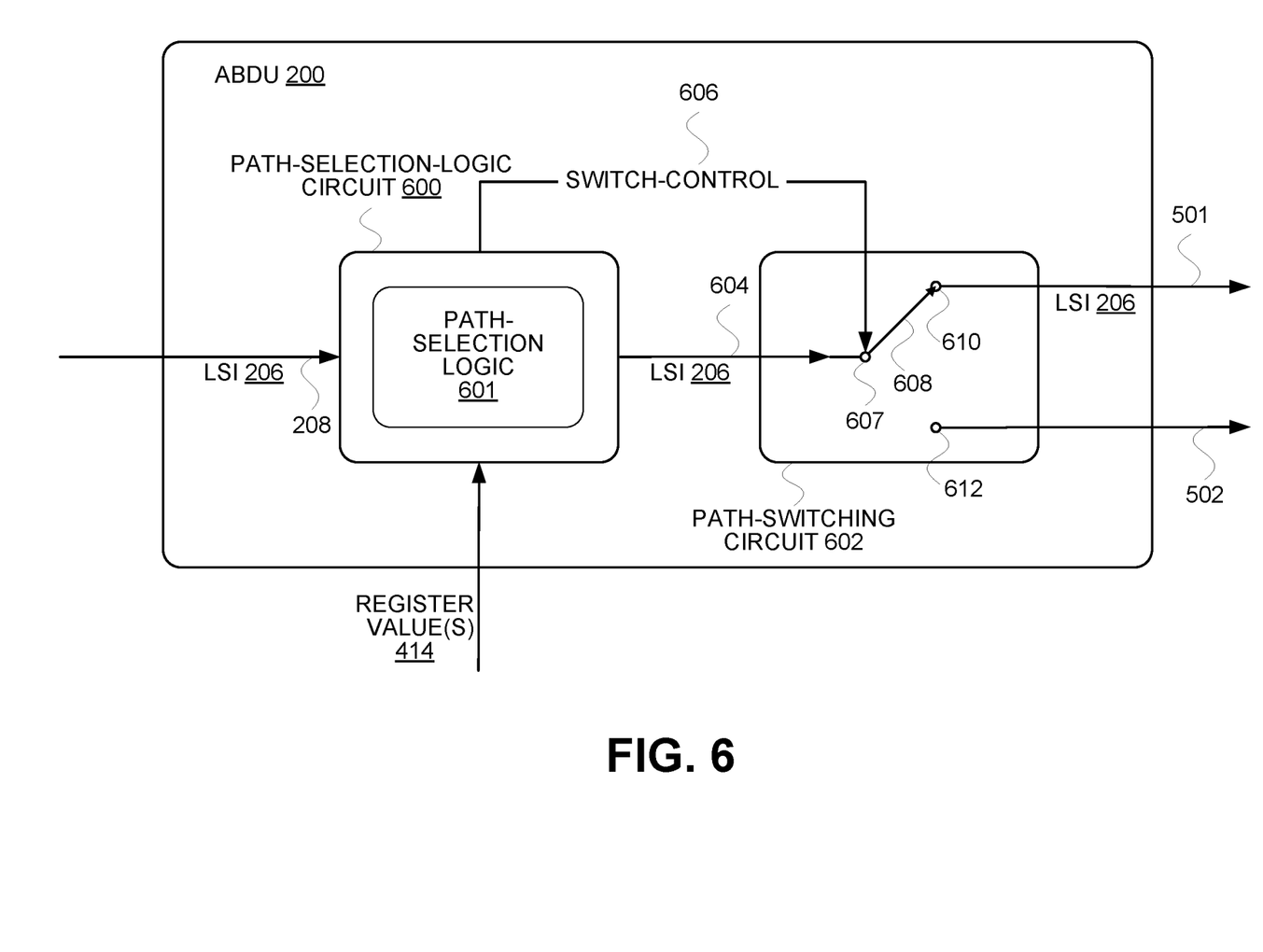
FIG. 6 is a simplified diagram of the ABDU of FIG. 5 in a first example circuit configuration, in accordance with an embodiment.

FIG. 6 depicts an example in which the ABDU 200 includes a path-selection-logic circuit 600 and a path-switching circuit 602. The inputs to the path-selection-logic circuit 600 are the load/store instruction 206 and the register values 414, and the outputs of the path-selection-logic circuit 600 are the load/store instruction 206 (via a data link 604) and a switch-control signal 606. The path-selection-logic circuit 600 implements path-selection logic 601. The inputs of the path-switching circuit 602 are the load/store instruction 206 (via the data link 604) and the switch-control signal 606, and the output of the path-switching circuit 602 is the load/store instruction 206 on either the data link 501 or the data link 502.

The path-switching circuit 602 includes a switchpoint 607, a switchable data link 608, a contact 610 at an initial end of the data link 501, and a contact 612 at an initial end of the data link 502. FIG. 6 depicts the ABDU 200 routing the load/store instruction 206 via the AGEN path 201. The switchable data link 608 extends from the switchpoint 607 to the contact 610, resulting in the path-switching circuit 602 (and therefore the ABDU 200) outputting the load/store instruction 206 on the data link 501.

Figure 7:
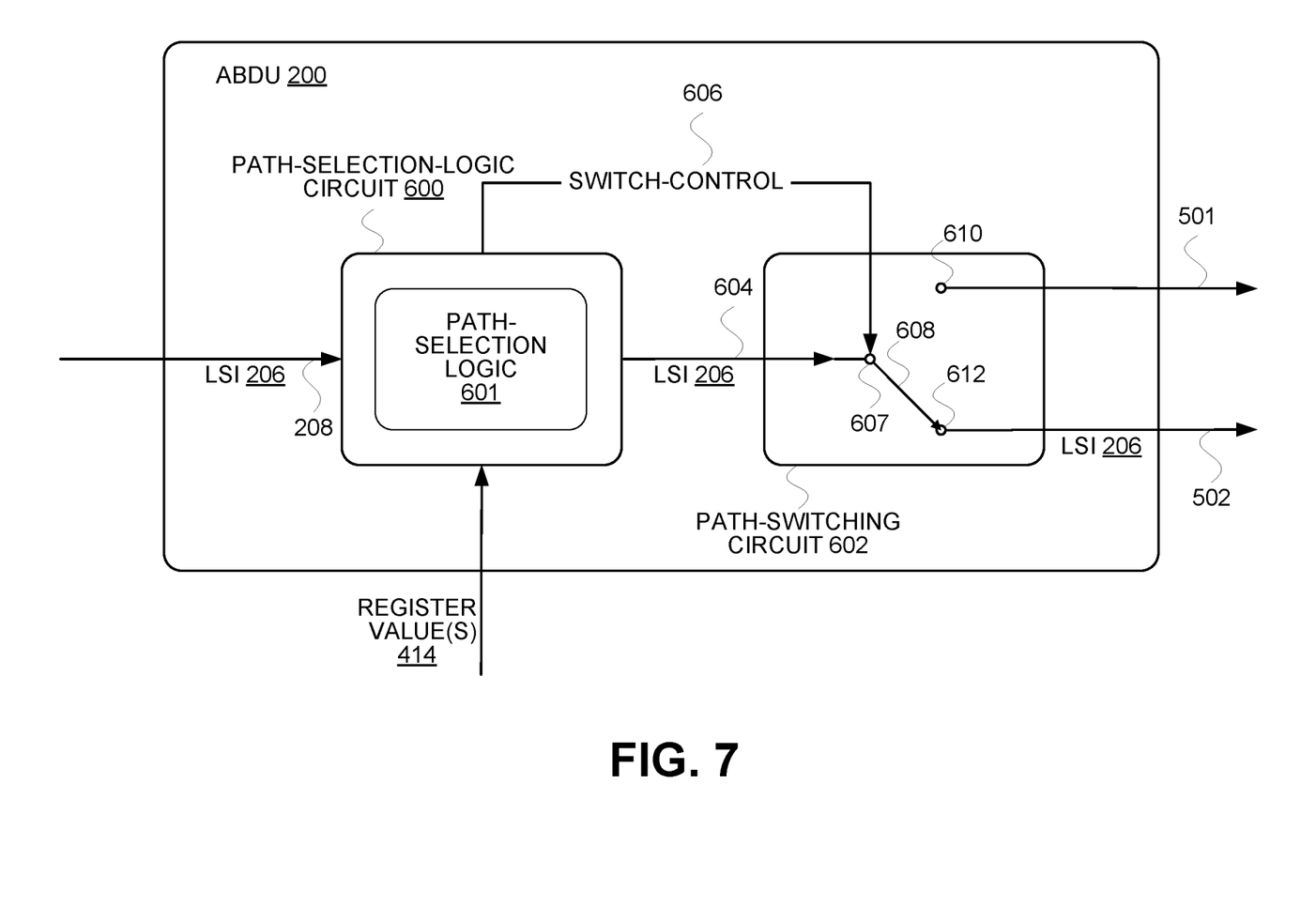
FIG. 7 is a simplified diagram of the ABDU of FIG. 5 in a second example circuit configuration, in accordance with an embodiment.

FIG. 7 depicts an example in which the ABDU 200 routes the load/store instruction 206 via the AGEN-bypass path 202. The switchable data link 608 extends from the switchpoint 607 to the contact 612, resulting in the path-switching circuit 602 (and therefore the ABDU 200) outputting the load/store instruction 206 on the data link 502.

Figure 8:
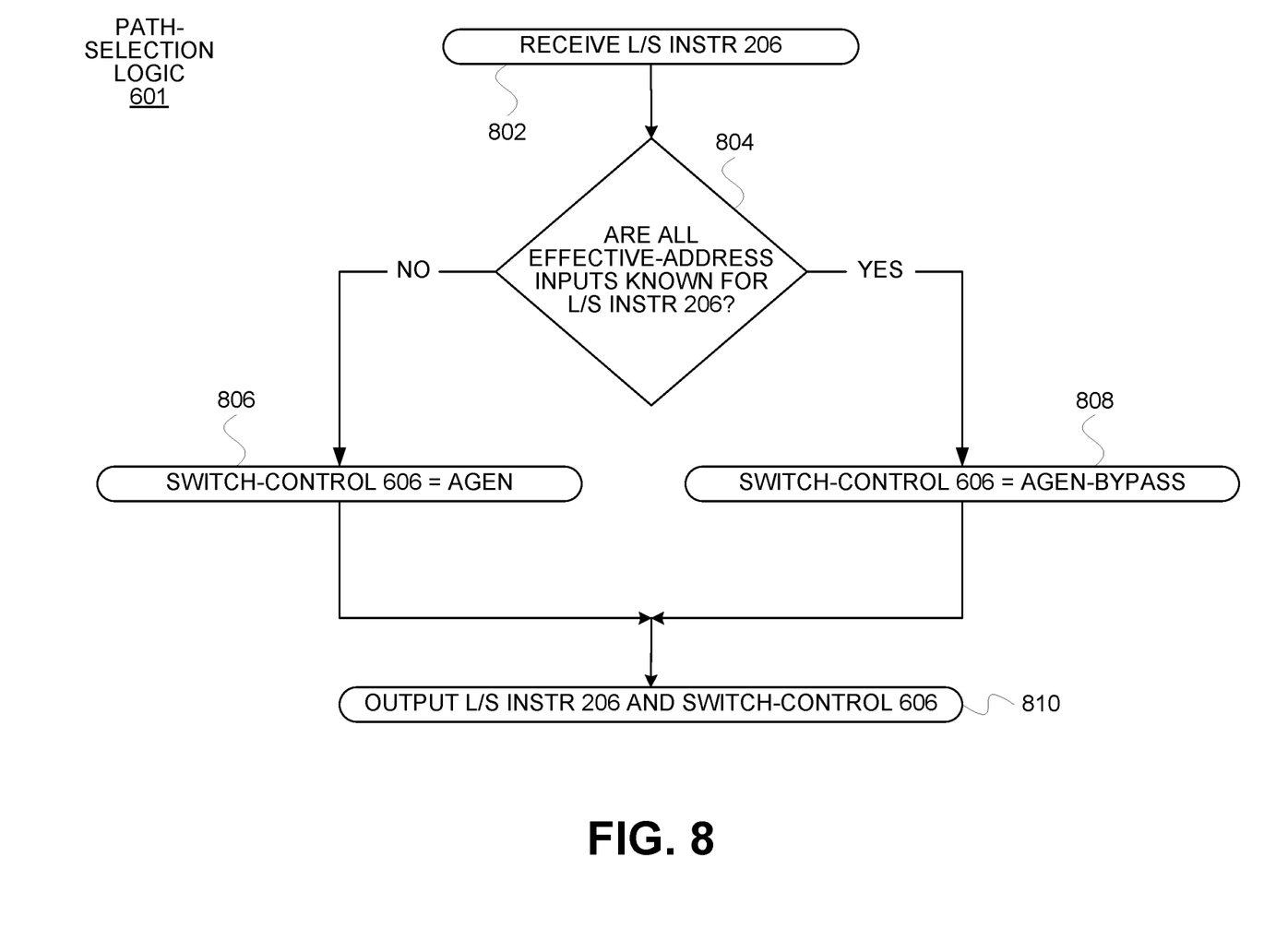
FIG. 8 is a flowchart depicting an example substantive implementation of path-selection logic in an ABDU, in accordance with an embodiment.

FIG. 8 depicts an example implementation of the path-selection logic 601 as implemented by the path-selection-logic circuit 600. At step 802, the path-selection-logic circuit 600 receives the load/store instruction 206 from a fetch stage (not depicted) or other stage of the instruction pipeline of the processor 102.

At step 804, the path-selection-logic circuit 600 determines whether all of the effective-address inputs for the load/store instruction 206 are known. If the determination that is made at step 804 is that all of the effective-address inputs for the load/store instruction 206 are not known, then at step 806 the path-selection-logic circuit 600 sets the switch-control signal 606 to AGEN, which could be implemented as a logical binary 0. If, however, the determination that is made at step 804 is that all of the effective-address inputs for the load/store instruction 206 are known, then at step 808 the path-selection-logic circuit 600 sets the switch-control signal 606 to AGEN-BYPASS, which could be implemented as a logical binary 1. At step 810, the path-selection-logic circuit 600 outputs both the load/store instruction 206 and the switch-control signal 606 (set to either AGEN or AGEN-BYPASS).

In an embodiment, in instances in which the load/store instruction 206 includes one or more references to one or more registers, the path-selection logic 601 includes, as a necessary condition to determining at step 804 that all of the effective-address inputs for the load/store instruction 206 are known, that the ABDU 200 has a current value of each such register. In one example, the ABDU 200 obtains such values in the register values 414 from the RVUR 412.

When the path-selection-logic circuit 600 sets the switch-control signal 606 to AGEN, the path-switching circuit 602 responsively places the switchable data link 608 in the position shown in FIG. 6, and the ABDU 200 routes the load/store instruction 206 via the AGEN path 201. When the path-selection-logic circuit 600 instead sets the switch-control signal 606 to AGEN-BYPASS, the path-switching circuit 602 responsively places the switchable data link 608 in the position shown in FIG. 7, and the ABDU 200 routes the load/store instruction 206 via the AGEN-bypass path 202.

Figure 9:
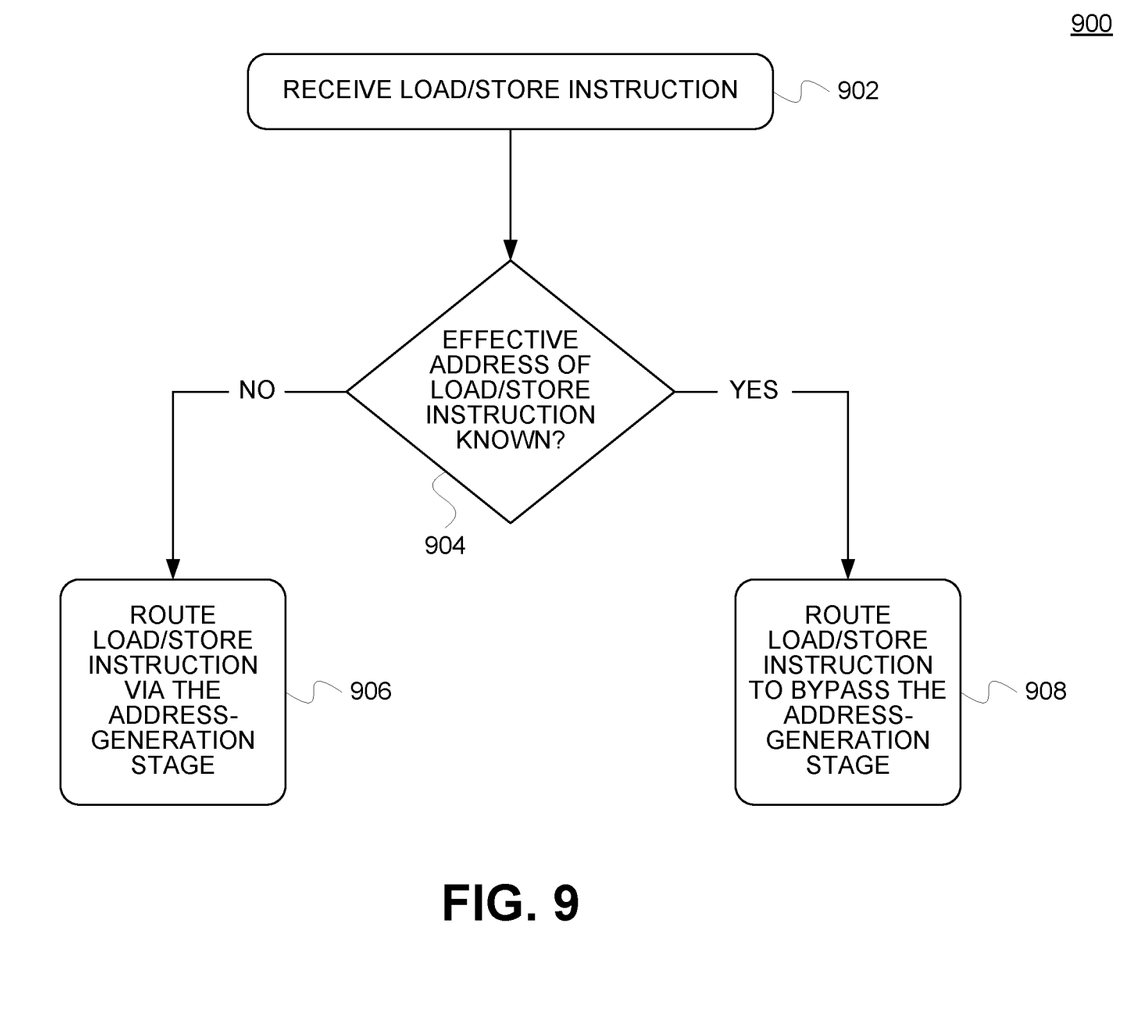
FIG. 9 is a flowchart of an example method of selectively bypassing address-generation hardware, in accordance with an embodiment.

FIG. 9 is a flowchart of an example method 900 of selectively bypassing AGEN hardware. Unless otherwise specified, the method 900 is described below with reference to the instruction pipeline that is depicted in FIG. 4. For example, references are made to the load/store unit of FIG. 4 (i.e., the LSDC 406) as opposed to the load/store unit 300 of FIG. 3. In some embodiments, the ABDU 200 carries out the method 900 with respect to a single load/store instruction per clock cycle, while in other embodiments the ABDU 200 carries out the method 900 with respect to multiple load/store instructions per clock cycle.

At step 902, the ABDU 200 receives the load/store instruction 206 from a fetch stage (not depicted) or other stage of the instruction pipeline of the processor 102. In an embodiment, the load/store instruction 206 includes all of the information that the ABDU 200 needs in order to decide whether to route the load/store instruction 206 via the AGEN path 201 or via the AGEN-bypass path 202. The method 900 also includes steps 906 and 908. In any given instance of the ABDU 200 carrying out the method 900, the ABDU 200 performs either step 906 or step 908, depending on whether an effective address for the load/store instruction 206 is known at the ABDU 200, as represented in FIG. 9 by a decision box 904.

If the effective address for the load/store instruction 206 is not known at the ABDU 200, then at step 906 the ABDU 200 routes the load/store instruction 206 via the AGEN stage 204. In an embodiment, the effective address for the load/store instruction 206 is not known at the ABDU 200 when at least one of the inputs for computing the effective address for the load/store instruction 206 is not known at the ABDU 200. In an embodiment, the ABDU 200 carries out step 906 by routing the load/store instruction 206 via the AGEN path 201, which, in an embodiment, traverses the EXSC 404 and includes the AGEN stage 204 that resides therein.

If, however, the effective address for the load/store instruction 206 is known at the ABDU 200, then at step 908 the ABDU 200 routes the load/store instruction 206 to bypass the AGEN stage 204. In an embodiment, the effective address for the load/store instruction 206 is known at the ABDU 200 when each of the inputs for computing the effective address for the load/store instruction 206 is known at the ABDU 200. In an embodiment, the ABDU 200 carries out step 908 by routing the load/store instruction 206 via the AGEN-bypass path 202. In some embodiments, the AGEN-bypass path 202 traverses the EXSC 404 (but not the AGEN stage 204). In other embodiments, the AGEN-bypass path 202 does not traverse the EXSC 404.

In various different embodiments, there are a number of different ways and cases in which the ABDU 200 selectively carries out either step 906 or step 908 with respect to a given load/store instruction, as represented by the decision box

904. To explain some of those options, it is assumed that the processor 102 uses a "base+index+offset" addressing scheme, according to which the load/store instruction 206 has the structure Load|Reg1|Base|Index|Offset (simplified for the purpose of this disclosure—other fields could be present and other addressing schemes could be used).

This is an instruction to "load" (which is the op code) into a register named "reg1" the value that is stored in memory at the address that is the sum of (i) the value in the "base" field or stored in a register identified in the "base" field, (ii) the value in the "index" field or stored in a register identified in the "index" field, and (iii) the value in the "offset" field.

In an embodiment, the ABDU 200 selectively carries out either step 906 or step 908 with respect to the load/store instruction 206 by determining whether the ABDU 200 has current values for each of the base, index, and offset fields of the load/store instruction 206. In the typical case of the offset field containing a constant (as opposed to a reference or pointer to a value stored elsewhere), the ABDU 200 can consider the offset to be known. As to the base and index, the ABDU 200 can consider those to be known if they are a constant (i.e., 0 or another integer) or if they contain a reference to a register (such as the PC, the rSP, or any other register) for which the ABDU has a current value. One way that the ABDU 200 could have a current value for a referenced register is that the RVUR 412 recently relayed to the ABDU 200 a copy of the data stored in the referenced register.

In an embodiment, the effective address for the load/store instruction 206 is known at the ABDU 200 when the load/store instruction 206 is a PC-relative load/store instruction. The PC (a.k.a. the instruction pointer (IP)) is a register that stores the address of the current instruction being executed (or in some cases next to be executed) by the processor 102. Modifying the above example instruction structure into a PC-relative instruction results in the instruction Load|Reg1|PC|0|Offset.

The effective address for this instruction is the sum of the value in the PC register and the value in the offset field of the instruction (and in some cases there is a non-zero constant in the index field, which is also included in the sum).

In an embodiment, the effective address for the load/store instruction 206 is known at the ABDU 200 when the load/store instruction 206 is a displacement-only load/store instruction, such as the instruction Load|Reg1|0|0|Offset. The effective address for this instruction is the value in the offset field. In some cases, a non-zero constant is present in one or both of the base and index fields, in which case the effective address is still the sum of the base, index, and offset fields, but does not equal the value in the offset field.

In an embodiment, the effective address for the load/store instruction 206 is known at the ABDU 200 when (i) the load/store instruction 206 is an SP-relative load/store instruction and (ii) the ABDU 200 has a current value of the rSP, which is a register that holds the memory address of the current top of the stack (a.k.a. the call stack, the execution stack, the program stack, the control stack, the run-time stack, the machine stack, and the like). An example SP-relative load/store instruction is Load|Reg1|rSP|0|Offset. The effective address for this instruction is the sum of the value in the rSP and the value in the offset field (and any non-zero value present in the index field).

Figure 10:
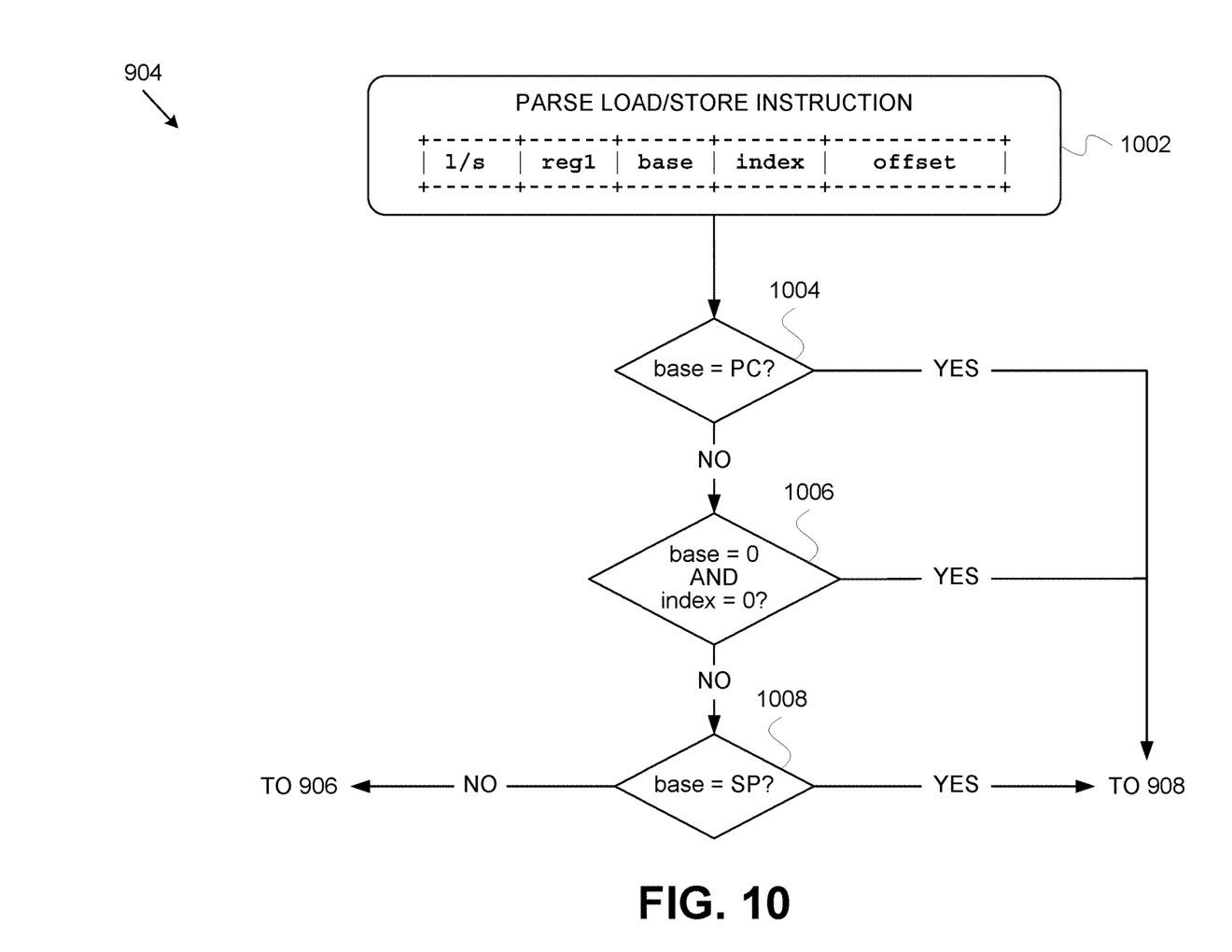
FIG. 10 is a flowchart of an example implementation of a load/store-instruction-routing selection that is carried out as part of the method of FIG. 9, in accordance with an embodiment.

FIG. 10 is a flowchart of one example implementation of the load/store-instruction-routing selection that is represented in FIG. 9 by the decision box 904. At step 1002, the ABDU 200 parses the load/store instruction 206. In this example, the load/store instruction 206 has the form L/S|Reg1|Base|Index|Offset where "l/s" represents either a "load" or a "store" for the op code.

At step 1004, the ABDU 200 determines whether the base field of the load/store instruction 206 contains a reference to the PC—i.e., whether the load/store instruction 206 is a PC-relative load/store instruction. If the determination that is made at step 1004 is that the base field of the load/store instruction 206 does contain a reference to the PC, then at step 908 the ABDU 200 routes the load/store instruction to bypass the AGEN stage 204. If, however, the determination that is made at step 1004 is that the base field of the load/store instruction 206 does not contain a reference to the PC, then control proceeds to step 1006, where the ABDU 200 determines whether both the base field and the index field of the load/store instruction 206 are equal to zero—i.e., whether the load/store instruction 206 is a displacement-only load/store instruction. In an embodiment, step 1004 includes a second necessary condition, which is that the ABDU 200 has a current value of the PC.

If the determination that is made at step 1006 is that both the base field and the index field of the load/store instruction 206 are equal to zero, then at step 908 the ABDU 200 routes the load/store instruction to bypass the AGEN stage 204. If, however, the determination that is made at step 1006 is that both the base field and the index field of the load/store instruction 206 are not equal to zero—i.e., that at least one of those two fields is not equal to zero, then control proceeds to step 1008, where the ABDU 200 determines whether the base field of the load/store instruction 206 contains a reference to the rSP—i.e., whether the load/store instruction 206 is an SP-relative load/store instruction.

If the determination that is made at step 1008 is that the base field of the load/store instruction 206 does contain a reference to the rSP, then at step 908 the ABDU 200 routes the load/store instruction 206 to bypass the AGEN stage 204. If, however, the determination that is made at step 1008 is that the base field of the load/store instruction 206 does not contain a reference to the rSP, then at step 906 the ABDU 200 routes the load/store instruction 206 via the AGEN stage 204. In an embodiment, step 1008 includes a second necessary condition, which is that the ABDU 200 has a current value of the rSP. In some embodiments, steps 1004, 1006, and 1008 are performed simultaneously on the load/store instruction 206 as a logical OR of the three different cases.

In some embodiments, the processor 102 implements a control flow for the AGEN-bypass path 202. In such embodiments, the AGEN-bypass path 202 not only carries the load/store instructions that the ABDU 200 routes via that path, but also includes signaling paths to carry control information that is pertinent to, and communicated in parallel with, those load/store instructions. In some implementations, this control information takes the form of a binary flag—referred to as the "bypass-eligible flag"—that is transmitted along the AGEN-bypass path 202 in parallel with each load/store instruction that is routed via that path. The bypass-eligible flag being asserted (i.e., set, equal to 1) indicates that the corresponding load/store instruction is eligible to bypass the AGEN stage 204, whereas the bypass-eligible flag being cleared (i.e., reset, equal to 0) indicates that the corresponding load/store instruction is not eligible to bypass the AGEN stage 204.

In an embodiment in which such a control flow is implemented, one or more components of the instruction pipeline (i) process the load/store instructions that are on the AGEN-bypass path 202 and that have their bypass-eligible flag asserted and (ii) ignore the load/store instructions that are on the AGEN-bypass path 202 and that have their bypass-eligible flag cleared. Such components include the LSDC 406 and, in some embodiments, also include the EXSC 404 and/or one or more other components.

In another example, such a control flow is not employed. In this case, (i) each load/store instruction 206 that is assessed for AGEN-bypass eligibility by the ABDU 200 is routed via only one of the two paths—i.e., either the AGEN path 201 or the AGEN-bypass path 202 but not both and (ii) only relatively simple types of load/store instructions (e.g., displacement-only) are eligible for bypassing the AGEN stage 204. A control flow could be implemented in this type of embodiment, but it is not needed because those types of relatively simple load/store instructions do not become ineligible to bypass the AGEN stage 204.

In some embodiments, load/store instructions with register-dependent (e.g., rSP-relative) addressing are eligible for AGEN bypass. In at least some such embodiments, the control flow is implemented such that every load/store instruction that is routed via the AGEN-bypass path 202 has its bypass-eligible flag initially asserted. If the processor 102 later determines that the instruction is no longer eligible for AGEN bypass (if, e.g., the instruction is dependent on what is then an invalid rSP value), the processor 102 clears the corresponding bypass-eligible flag and backtracks in its overall progress in order to then route that instruction via the AGEN path 201.

In some embodiments, every load/store instruction that is assessed for AGEN-bypass eligibility by the ABDU 200 is transmitted via the AGEN-bypass path 202. The load/store instructions that are determined by the ABDU 200 to be eligible for AGEN-bypass have their corresponding bypass-eligible flag asserted (and are the instructions that are considered in the parlance of this disclosure to have been routed via the AGEN-bypass path 202), while all other load/store instructions are still transmitted along the AGEN-bypass path 202 with their corresponding bypass-eligible flags cleared, and are accordingly ignored.

In an embodiment, in cases of load/store instructions that contain one or more register references, the processor 102 clears the bypass-eligible flag corresponding to any load/store instruction that had been routed via the AGEN-bypass path 202 if the processor 102 later determines that, for example, that load/store instruction contains what has become an invalid register reference. One example where this happens is the processor 102 determining that a write operation is pending for a register referenced by the given load/store instruction. Another example is the processor 102 determining that an instruction subsequent to the given load/store instruction has changed the value contained in a register referenced by the given load/store instruction.

In an embodiment, the ABDU 200 replaces any register references in the load/store instruction 206 with a copy of the data (e.g., an integer) that is currently stored in the referenced register. This could be carried out by the ABDU 200 using information from the register value(s) 414. In embodiments that operate in this manner, this step obviates the need for any downstream entities to spend time and energy retrieving data that the ABDU 200 already has.

In some embodiments, the ABDU 200 assesses whether the effective address is known at the ABDU 200 for each of multiple load/store instructions in a given clock cycle, and routes each assessed load/store instruction via either the AGEN path 201 or the AGEN-bypass path 202 accordingly. In some cases, this results in the ABDU 200 routing multiple load/store instructions in a given clock cycle via the AGEN-bypass path 202. Any plural number of load/store instructions could be so assessed and so routed in parallel. In an embodiment, up to 6 load/store instructions are processed by the ABDU in parallel per clock cycle.

In some embodiments, the ABDU 200 limits the number of load/store instructions that it routes via the AGEN-bypass path 202 in a given clock cycle. In some such cases, the upper limit in a given clock cycle is equal to the number of load/store pipelines that the LSDC 406 has. Thus, in one example, even though the ABDU 200 can route up to 6 load/store instructions per clock cycle via the AGEN-bypass path 202, the ABDU 200 never actually routes more than 3 load/store instructions per clock cycle via the AGEN-bypass path 202 because, in this example, the LSDC 406 only has 3 load/store pipelines.

The ABDU 200 enforces this upper limit in a number of different ways in different embodiments. In some embodiments, the ABDU 200 only routes at most the upper limit of load/store instructions per clock cycle via the AGEN-bypass path 202—by, e.g., asserting at most the upper limit of bypass-eligible flags per clock cycle. In other embodiments, the ABDU 200 implements a second control flag per load/store instruction. This second control flag is referred to herein as the bypass-selected flag, and load/store instructions are only processed on the AGEN-bypass path 202 by, e.g., the LSDC 406 if both the corresponding bypass-eligible flag and the corresponding bypass-selected flag are still asserted. The two-flag option perhaps provides more flexibility but comes at a resource cost.

In some instances, at least two load/store instructions routed via the AGEN-bypass path 202 in a given clock cycle are still AGEN-bypass-eligible when traversing the EXSC 404, since no invalidating event has yet occurred with respect to them. In some such embodiments, the EXSC 404 selects a particular one or more of those still-eligible instructions to proceed on the AGEN-bypass path 202, discarding the others. The EXSC 404 could make such selections randomly, or perhaps using a policy such as favoring load/store instructions that are not dependent on one or more registers over those that are (to lower the probability of incurring the costs that come with having to invalidate a load/store instruction that had initially been routed on the AGEN-bypass path 202). In at least some such embodiments, the EXSC 404 keeps track of its selections and apprises one or more other components of such decisions. In embodiments that implement a full back-out strategy whenever a load/store instruction on the AGEN-bypass path 202 has its AGEN-bypass eligibility revoked, the EXSC 404 notifies upstream entities such as the ABDU 200, the fetch unit, and the like, to cause the relevant load/store instruction to instead be routed via the AGEN path 201, and to cause the pipeline to be flushed if necessary.

In some embodiments, a copy of every load/store instruction that the ABDU 200 assesses is transmitted down both the AGEN path 201 and the AGEN-bypass path 202, and the corresponding control flags are available to entities in both paths. In such embodiments, in the parlance of this disclosure, a given load/store instruction is considered to have been routed by the ABDU 200 via the AGEN path 201 if the ABDU 200 initially clears the corresponding bypass-eligible flag and is instead considered to have been routed via the AGEN-bypass path 202 if the ABDU 200 initially asserts the corresponding bypass-eligible flag. In such embodiments, efficiencies can be gained vis-à-vis the full-back-out option in that the processor 102 often is able to clear a corresponding bypass-eligible flag in time to direct the AGEN stage 204 to compute an effective address for that load/store instruction. Alternatively, separate control paths could be implemented for the AGEN path 201 and the AGEN-bypass path 202.

In an embodiment, the decode unit 402 and the EXSC 404 cooperate with respect to the management of the decode unit 402's limited number of scheduler tokens. In an example implementation, when the EXSC 404 decides to revoke the AGEN-bypass eligibility of a given load/store instruction, the EXSC 404 responsively allocates a scheduler entry in the AGEN path 201. To be prepared for such an occurrence, in some embodiments, the decode unit 402 proactively assumes that this is going to happen and accordingly allocates a scheduler token (e.g., an ID) to every load/store instruction whether the ABDU 200 initially asserts or initially clears the corresponding bypass-eligible flag. Thus, when the EXSC 404 revokes the AGEN-bypass eligibility of a given instruction, that instruction has already been prepared to be processed by the AGEN stage 204. When the EXSC 404 instead allows a given load/store instruction to maintain its AGEN-bypass eligibility, the EXSC 404 returns the corresponding previously allocated scheduler token to the decode unit 402.

In an embodiment, there is also a token exchange between the EXSC 404 and the LSDC 406. In those cases, the tokens pertain to the current capacity of the various load/store pipelines in the LSDC 406. As the LSDC 406 picks instructions to process from those load/store pipelines, the LSDC 406 correspondingly informs the EXSC 404 by returning the corresponding load/store-pipeline token—that the EXSC 404 had allocated to that instruction—to the EXSC 404 for reuse.

Various embodiments take the form of a non-transitory computer-readable medium containing instructions executable by an integrated-circuit-manufacturing system to fabricate any of the described embodiments of the processor 102. The instructions contained on the computer-readable medium could take the form of or include an RTL representation; HDL (a.k.a. hardware description code) instructions in a language such as Analog HDL (AHDL), Verilog HDL, SystemVerilog HDL, Very High Speed Integrated Circuits (VHSIC) Hardware Description Language (VHDL), and/or the like; code in a higher-level or modeling language such as C, C++, SystemC, Simulink, MATLAB, and/or the like; physical layout code such as Graphic Database System II (GDSII) code; and/or one or more other types of instructions.

What is claimed is:

1. A method, carried out by one or more processors, the method comprising:
   receiving a load/store instruction into an address-generation-(AGEN)-bypass-determination unit (ABDU) of a processor;
   routing the load/store instruction to an AGEN stage of the processor if an effective address for the load/store instruction is not known at the ABDU; and
   routing the load/store instruction, to a load/store unit, to bypass the AGEN stage if the effective address for the load/store instruction is known at the ABDU wherein the effective address for the load/store instruction is known at the ABDU when each of a plurality of the effective-address inputs for the load/store instruction is known at the ABDU.

2. The method of claim 1, wherein the effective address for the load/store instruction is known at the ABDU when the load/store instruction is a program-counter-(PC)-relative load/store instruction.

3. The method of claim 1, wherein the effective address for the load/store instruction is known at the ABDU when the load/store instruction is a displacement-only load/store instruction.

4. The method of claim 1, wherein the effective address for the load/store instruction is known at the ABDU when:
   the load/store instruction is a stack-pointer-(SP)-relative load/store instruction; and
   the ABDU has a current value of an SP register (rSP).

5. The method of claim 1, wherein:
   the AGEN stage is configured to compute the effective address for the load/store instruction using the plurality of effective-address inputs for the load/store instruction; and
   the effective address for the load/store instruction is not known at the ABDU when at least one of the effective-address inputs for the load/store instruction is not known at the ABDU.

6. The method of claim 1, wherein:
   the processor further comprises:
      the load/store unit;
      a first circuit path that communicatively couples the ABDU and the load/store unit, and that includes the AGEN stage; and
      a second circuit path that communicatively couples the ABDU and the load/store unit, and that bypasses the AGEN stage,
   wherein:
   routing the load/store instruction to the AGEN stage comprises routing the load/store instruction via the first circuit path; and
   routing the load/store instruction to bypass the AGEN stage comprises routing the load/store instruction via the second circuit path.

7. The method of claim 6, wherein:
   routing the load/store instruction via the second circuit path comprises asserting a bypass- eligible flag that corresponds with the load/store instruction; and
   the load/store unit is configured to:
      process load/store instructions for which the corresponding bypass-eligible flag is asserted; and
      discard load/store instructions for which the corresponding bypass-eligible flag is cleared.

8. The method of claim 6, carried out by the processor with respect to a first integer number of load/store instructions per clock cycle, the method further comprising:
   asserting a corresponding bypass-eligible flag for each load/store instruction that is routed via the second circuit path,
   wherein the load/store unit is configured to:
      process load/store instructions for which the corresponding bypass-eligible flag is asserted; and
      discard load/store instructions for which the corresponding bypass-eligible flag is cleared.

9. The method of claim 8, further comprising asserting a corresponding bypass-eligible flag for at most a second integer number of load/store instructions per clock cycle, wherein the second integer number is less than the first integer number.

10. The method of claim 9, wherein the load/store unit has exactly the second integer number of load/store pipelines.

11. The method of claim 6, wherein the load/store unit is configured to compute effective addresses for load/store instructions received by the load/store unit via the second circuit path.

12. The method of claim 1, wherein:
the load/store instruction comprises a reference to a register; and
the method further comprises replacing the reference in the load/store instruction with a value currently stored in the register.

13. A processor comprising:
an address-generation (AGEN) stage; and
an AGEN-bypass-determination unit (ABDU) configured to:
  receive a load/store instruction;
  route the load/store instruction to the AGEN stage if an effective address for the load/store instruction is not known at the ABDU; and
  route the load/store instruction, to a load/store unit, to bypass the AGEN stage if the effective address for the load/store instruction is known at the ABDU, wherein the effective address for the instruction is known at the ABDU when each of a plurality of the effective-address inputs for the load/store instruction is known at the ABDU.

14. The processor of claim 13, wherein the effective address for the load/store instruction is known at the ABDU when the load/store instruction is a program-counter-(PC)-relative load/store instruction.

15. The processor of claim 13, wherein the effective address for the load/store instruction is known at the ABDU when the load/store instruction is a displacement-only load/store instruction.

16. The processor of claim 13, wherein the effective address for the load/store instruction is known at the ABDU when:
the load/store instruction is a stack-pointer-(SP)-relative load/store instruction; and
the ABDU has a current value of an SP register (rSP).

17. The processor of claim 13, wherein:
the AGEN stage is configured to compute the effective address for the load/store instruction using the plurality of effective-address inputs for the load/store instruction; and
the effective address for the load/store instruction is not known at the ABDU when at least one of the effective-address inputs for the load/store instruction is not known at the ABDU.

18. The processor of claim 13, further comprising:
the load/store unit;
a first circuit path that communicatively couples the ABDU and the load/store unit, and that includes the AGEN stage; and
a second circuit path that communicatively couples the ABDU and the load/store unit, and that bypasses the AGEN stage,
wherein the ABDU is configured to:
  route the load/store instruction to the AGEN stage via the first circuit path; and
  route the load/store instruction to bypass the AGEN stage via the second circuit path.

19. The processor of claim 18, wherein:
the ABDU is configured to assert a bypass-eligible flag that corresponds with the load/store instruction when routing the load/store instruction via the second circuit path; and
the load/store unit is configured to:
  process load/store instructions for which the corresponding bypass-eligible flag is asserted; and
  discard load/store instructions for which the corresponding bypass-eligible flag is cleared.

20. The processor of claim 18, further configured to:
route each of a first integer number of load/store instructions per clock cycle via either the first circuit path or the second circuit path; and
assert a corresponding bypass-eligible flag for each load/store instruction that is routed via the second circuit path,
wherein the load/store unit is configured to:
  process load/store instructions for which the corresponding bypass-eligible flag is asserted; and
  discard load/store instructions for which the corresponding bypass-eligible flag is cleared.

21. The processor of claim 20, further configured to assert a corresponding bypass-eligible flag for at most a second integer number of load/store instructions per clock cycle, wherein the second integer number is less than the first integer number.

22. The processor of claim 21, wherein the load/store unit has exactly the second integer number of load/store pipelines.

23. The processor of claim 18, wherein the load/store unit is configured to compute effective addresses for load/store instructions received by the load/store unit via the second circuit path.

24. The processor of claim 13, wherein:
the load/store instruction comprises a reference to a register; and
the ABDU is configured to replace the reference in the load/store instruction with a value currently stored in the register.

25. A non-transitory computer-readable medium containing instructions executable by an integrated-circuit-manufacturing system to fabricate a processor comprising:
an address-generation (AGEN) stage; and
an AGEN-bypass-determination unit (ABDU) configured to:
receive a load/store instruction;
route the load/store instruction to the AGEN stage if an effective address for the load/store instruction is not known at the ABDU; and
route the load/store instruction, to a load/store unit, to bypass the AGEN stage if the effective address for the load/store instruction is known at the ABDU, wherein the effective address for the load/store instruction is known at the ABDU when each of a plurality of the effective-address inputs for the load/store instruction is known at the ABDU.

* * * * *